(12) United States Patent
Hutchings et al.

(10) Patent No.: US 11,156,260 B2
(45) Date of Patent: Oct. 26, 2021

(54) ANTI-VIBRATION MOUNT

(71) Applicant: BAE SYSTEMS plc, London (GB)

(72) Inventors: Michael Antony Hutchings, Barrow-in-Furness (GB); Thomas James Fairchild, Barrow-in-Furness (GB)

(73) Assignee: BAE Systems, plc, London (GB)

( * ) Notice: Subject to any disclaimer, the term of this patent is extended or adjusted under 35 U.S.C. 154(b) by 28 days.

(21) Appl. No.: 16/640,830

(22) PCT Filed: Aug. 20, 2018

(86) PCT No.: PCT/GB2018/052351
§ 371 (c)(1),
(2) Date: Feb. 21, 2020

(87) PCT Pub. No.: WO2019/038524
PCT Pub. Date: Feb. 28, 2019

(65) Prior Publication Data
US 2020/0408269 A1 Dec. 31, 2020

(30) Foreign Application Priority Data

Aug. 21, 2017 (EP) ...................................... 17275124
Aug. 21, 2017 (GB) ...................................... 1713366

(51) Int. Cl.
*F16F 1/373* (2006.01)
*F16F 1/38* (2006.01)
(52) U.S. Cl.
CPC .......... *F16F 1/3735* (2013.01); *F16F 1/3835* (2013.01)

(58) Field of Classification Search
CPC ...... F16F 1/3732; F16F 1/3735; F16F 1/3828; F16F 1/3835
See application file for complete search history.

(56) References Cited

U.S. PATENT DOCUMENTS

| 3,350,042 | A |   | 10/1967 | Stewart et al. |
| 4,521,004 | A |   | 6/1985  | Caldwell |
| 5,139,244 | A | * | 8/1992  | Chakko ..................... F16F 1/38 267/293 |

(Continued)

FOREIGN PATENT DOCUMENTS

| DE | 20105490 U1 | * | 6/2001 | ............ F16F 1/3732 |
| EP | 0899476 A1 | * | 3/1999 | ............ F16F 1/376 |

(Continued)

OTHER PUBLICATIONS

International Search Report and Written Opinion received for PCT Application No. PCT/GB2018/052351, dated Oct. 1, 2018. 13 pages.

(Continued)

Primary Examiner — Thomas J Williams
(74) Attorney, Agent, or Firm — Finch & Maloney PLLC

(57) ABSTRACT

Disclosed is an anti-vibration apparatus comprising a bush, said bush comprising a substantially rigid, elongate core, covered in a vibration dampening material having at least one end cap washer, configured in that the bush engages with the end cap washer to cover the end of the elongate core, characterised in that the vibration dampening material further comprises a plurality of recessed portions on its surface.

20 Claims, 3 Drawing Sheets

(56) References Cited

U.S. PATENT DOCUMENTS

| | | | | |
|---|---|---|---|---|
| 5,263,778 | A * | 11/1993 | Jordens | B60G 7/00 |
| | | | | 384/140 |
| 5,303,896 | A * | 4/1994 | Sterka | F02B 75/34 |
| | | | | 244/54 |
| 5,544,871 | A * | 8/1996 | Reinemuth | B60R 21/2037 |
| | | | | 248/635 |
| 6,173,812 | B1 * | 1/2001 | Spivey | B60R 3/02 |
| | | | | 182/88 |
| 6,354,578 | B1 | 3/2002 | Nakatsukasa et al. | |
| 7,469,912 | B2 | 12/2008 | Maruyama et al. | |
| 2005/0286821 | A1 * | 12/2005 | Wagener | B60G 7/00 |
| | | | | 384/147 |
| 2020/0240135 | A1 * | 7/2020 | Stevens | E04B 1/82 |

FOREIGN PATENT DOCUMENTS

| | | | | |
|---|---|---|---|---|
| EP | 2662591 A1 | | 11/2013 | |
| FR | 2526899 A1 * | | 11/1983 | F16F 1/3835 |
| GB | 1123818 | | 8/1968 | |
| JP | 2013242015 A | | 12/2013 | |
| WO | 2019038524 A1 | | 2/2019 | |

OTHER PUBLICATIONS

GB Search Report under Section 17(5) received for GB Application No. 1713366.1 dated Jan. 25, 2018. 3 pages.
Extended European Search Report received for EP Application No. 17275124.0, dated Mar. 5, 2018. 9 pages.
International Preliminary Report on Patentability received for PCT Application No. PCT/GB2018/052351, dated Mar. 5, 2020. 7 pages.

* cited by examiner

ANTI-VIBRATION MOUNT

The present invention relates to an anti-vibration mount for use, particularly, in machinery. Arrangements of the present invention may find other uses in other systems.

In many areas of engineering or mechanics, the vibrations caused by motion of, for example, machinery can have undesirable effects, whether those affects be unwanted noise or in fact, damage to a machine or system components. As a result it is a recognised and common practice to attempt to isolate vibrations caused by machines or reduce vibration effects on machines.

Known methods of vibration suppression are generally split into two types of approaches, active suppression and passive suppression. Active suppression involves the use of destructive interference to cancel-out unwanted vibrations; passive suppression involves the use of materials or mechanics to dampen unwanted vibrations.

Numerous methods of passive vibration suppression solutions are known and employed to suppress vibrations in mechanical devices. These may include springs, pads or sheets of flexible material, rubber moulds, air bladders or larger, more industrial solutions such as base isolators, constructed from neoprene and steel, used to lower the vibrational frequency of buildings. Of these methods, some are better suited to certain applications, whether due to weight, durability, cost or size, however all aim to isolate vibrations caused by a machine or component to as little as possible by ensuring the method of vibration suppression is correctly paired with the intended use.

In prior art, known vibration suppression mounts used for machinery may comprise a bush having a core, often formed from steel, and a vibration damping material, such as for example an elastomer material coating the outer surface of the core. The vibration suppression mount is used to aid support for the weight of a machine, the steel core preventing the over-compression of the suppression mount's vibration dampening material, and the vibration dampening material is used to reduce/isolate vibrations of the machine. In use the vibrations caused by the machine oscillate at a frequency, which passes into the vibration suppression mount and is dampened as it passes through the vibration dampening material surrounding the core.

It is an aim of the present invention to increase the effectiveness of acoustic vibration isolation in machine mounts.

According to the present invention there is provided an anti-vibration apparatus comprising a bush, said bush comprising a substantially rigid elongate core, said elongate core comprises on its outer surface a vibration dampening material, the bush having at least one end cap washer, arranged such that the bush engages with the end cap washer to cover the end of the elongate core, characterised in that the vibration dampening material further comprises a plurality of recessed portions on its surface. Preferably there are two end cap washers at both ends of the bush.

The elongate core provides the structural rigidity for the bush; it may be formed from a substantially rigid material, such as a metal, metal alloys or composite, preferably a metal, such as for example steel. The elongate core is covered in the vibration dampening material which comprises a plurality of recessed portions on its surface. The elongate core provides support of a machine or component whose vibrations it is intended to suppress. The material of the elongate core may be selected provided it has sufficient rigidity to support at least some of the weight of the machine.

The dimensions of the elongate core may be selected depending on the application. The elongate core may have a diameter in the range of from 10 mm to 300 mm, preferably 10 mm to 100 mm. As one example in a waterborne vessel, the elongate core may be formed of steel with a diameter in the range from 10 mm to 30 mm.

The elongate core may have a length in the range of 10 mm to 400 mm, preferably in the range of 30 mm to 200 mm.

The elongate core may be solid, hollow or filled with a low density matrix filler, to reduce the mass. For example in one arrangement the elongate core may be tubular and comprise an inner diameter of 12 mm-22 mm and an outer diameter of 15 mm-25 mm. The steel core may have a length in the range of 30 mm-150 mm.

The size of the elongate core may vary if the elongate core is comprised of a material other than metal. There may be a plurality of anti-vibration apparatuses used to support a machine.

Located at a first end of the elongate core is an end cap washer, positioned to retain the elongate core and vibration dampening material. The end cap washer may be comprised of a further vibration dampening material, which may be selected from the same or different material to the vibration dampening material that coats the elongate core. The first end cap washer may be located in a rigid support housing. The support housing may be independently selected from the same materials as the elongate core.

In a preferred arrangement the end cap washer may comprise the further vibration dampening material located on its inner surface. The further vibration dampening material may provide further suppression of machine born vibrations and to aid this may comprise a step or recess, to provide additional expansion space. The end cap washer may be either fixed or reversibly attached, preferably reversibly attached to the vibration dampening material on the elongate core. The end cap washer preferably has a step or notch, such that the vibration dampening material on the elongate core is located in the notch/step of the end cap washer's further vibration dampening material.

In a preferred arrangement there are at least two end cap washers, one end cap washer positioned at each end of the elongate core, such that each end cap washer preferably has a step or notch, such that the vibration dampening material on the elongate core is located in both of the end cap washers' further vibration dampening material. The end cap washers further vibration dampening material and bush vibration dampening material are then caused to be engaged with part of the vibrating machine.

In a further arrangement there is at least one support housing abutting the outermost surface of the end cap washer, with said support housing being reversibly connected to the end cap washer and the elongate core. The support housing may be any rigid material, such as a metal, fibre composites or rigid polymers. Preferably there are two support housings.

When the mount is in use, the support housing in conjunction with the elongate core prevent over compression of the further vibration dampening material and vibration dampening material, respectively and so ensure an optimum level of rigidity of the vibration dampening material and further vibration dampening material.

In a preferred arrangement there is a retainer to retain the two support housings and at least two end cap washers in contact with the bush. The two support housings are required to be kept under compression, such as, for example the retainer may be an elongate bolt and nut.

The bolt may extend through the tubular elongate core, and a nut may be used to clamp the two support housings, two end cap washers on to the bush. In a further arrangement one of the two support housings may simply be a body or structure which is to be isolated from the vibration source, ie vibrating machine. According to a further aspect of the invention there is provided an anti-vibration system, for a body or structure, such as, for example a hull or chassis, a machine which produces vibration during operation, and one or more anti-vibration apparatuses as defined herein, wherein the one or more anti-vibration apparatuses are located between the hull or chassis and the machine, to reduce vibrations of said machine.

In use the vibration dampening material of the bush and the further vibration dampening material of the two end cap washers abut and retain the vibrating machine. To ensure that the machine during its vibration does not move away from the vibration dampening material and further vibration dampening material, there is a retainer which is mounted on the chases or hull, and clamps the vibration dampening material on the bush, and the vibration dampening material of the two end cap washers into engagement with the machine.

The apparatus is preferably fixed to a body, for example a mounting surface, such as a vehicle or vessel floor, hull, chassis or wall. The body may comprise an elongate bolt which extends through the apparatus and retains by clamping means the two support housings, two end cap washers and bush, such that they remain in abutting contact with the machine that vibrates.

The vibration dampening material suppresses machine born vibration that passes through the bush from the machine. The vibration dampening material may be selected from any resilient biased material, such as for example natural rubber, polymers, elastomers, or combinations thereof. The elastomers may be selected from polyurethanes, poly and perfluorinated polymers, polypropylenes, polybutyls, polyimides, polysulfones, nylons, or neoprene.

The vibration dampening material may preferably be a rubber or elastomer. The vibration dampening material may be formed into many shapes and in combination with its elasticity provides a high level of vibration suppression. It is found to be particularly advantageous when suppressing machine born vibrations. The selection of the vibration dampening material depends on the overall acoustic performance of the machine; therefore in order to adequately suppress a given machine vibration the bush comprising the vibration dampening material should have a natural frequency significantly less than that of the machines frequency.

This natural frequency of the vibration dampening material is determined by its rigidity, which in use may vary with the mass of the object it is supporting. As the mass of the object (for example machinery) is often not able to be changed, changing the vibration dampening material rigidity by material selection, composition or geometry can be a way of effecting vibration suppression performance.

If the vibration dampening material's movement is restricted when a force applying a compressive load is applied to the vibration dampening material surface the rigidity of the vibration dampening material will be high, compared to the rigidity of the vibration dampening material if it had free movement. Therefore the shape and free movement of the vibration dampening material, when used in vibration submission is an important consideration in design. It has been found that if the vibration dampening material has space to expand under a compressive load the likelihood of reaching the vibration dampening material's rigidity limit of effectiveness can be reduced, allowing it to have better vibration suppression result.

The vibration dampening material surrounding the elongate core is most effective when covering the entire elongate core, as this increases the amount of vibration dampening material available. The operation of the vibration dampening material works by being able to cushion the machine weight and under compression, mitigate the vibrations produced by machine movement and operation by providing an area for the machine vibrations to dissipate into as they pass through the vibration dampening material. It has been found that if the vibration dampening material is over compressed, for example due to a lack of expansion space the vibration dampening material becomes less able to absorb vibrations and so becomes less effective. Conversely the vibration dampening material must be of a certain rigidity to be operationally effective, otherwise it will not absorb machine vibrations, and as a result the vibration dampening material rigidity optimisation is important.

The provision of additional expansion space in the vibration dampening material prevents the material becoming overly compressed by machine weight and so optimises the rigidity of the vibration dampening material.

In a highly preferred arrangement this expansion space may be provided by incorporating a plurality of recessed portions in the surface of the vibration dampening material. The recessed portions may be formed in the vibration dampening material in order that they provide a cavity or void area to allow the compressed vibration dampening material to occupy and move into the cavity/void ie recessed area provided by the recessed portion. The recessed portions may have any cross section, such as v-shaped, u-shaped, such that it comprises walls and a floor.

In one arrangement the recess portion may have walls that are substantially straight and a floor, in a preferred arrangement at least one of the recessed portions comprises a sloped wall, or curved wall, preferably all recessed portions would comprise a sloped or curved wall creating an obtuse angle between the sloped wall and recessed portion floor. This further increases vibration suppression performance by allowing expansion of all areas of the wall throughout the recessed portion. The creation of a recessed portion with a sloped or curved wall also allows for increased speed of manufacturing as the recessed portions may be formed faster due to the lack of a need for increased accuracy over recessed portions with straight walls. Further, the use of curved portions mitigates against tearing of the vibration dampening material, as straight cuts can lead to failure points and tearing of the vibration dampening material.

Preferably there is a plurality of recessed portions extending across the surface of the vibration dampening material. The introduction of recessed portions into the vibration dampening material provides advantages in optimising rigidity; this has an additional benefit by allowing the bush to be mounted in a horizontal orientation as well as a vertical orientation. Conventional R2 anti-vibration mounts cannot be mounted horizontally due to the limitations of optimisation of rigidity to the mass of the machine over deforming the vibration dampening material.

Preferably there is a plurality of recessed portions extending across the surface of the further vibration dampening material.

The recessed portions may be present in a number of orientations or configurations on the vibration dampening material in order to provide a beneficial impact. These include, but are not limited to, a plurality of recessed "spots"

over the vibration dampening material, a recessed portion or groove, running the length of the vibration dampening material or a recessed portion or groove running circumferentially around the vibration dampening material on the elongate core. In a preferred arrangement there is a plurality of recessed portions running along the main axis of the vibration dampening material on the elongate core.

The recess portions thereby provide grooves/cavities and associated projections. In use, the vibration damping material's projections will abut and be in engagement with the vibrating machine. The projections will undergo deformation into (expand into) the grooves/cavities, reducing over compression of the vibration damping material and thereby permitting the vibration damping material to retain its ability to absorb vibrations.

The recess portions may be located abutting the elongate core, in this arrangement the vibration dampening material may still be deformed to prevent over compression.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

Figure 1A:
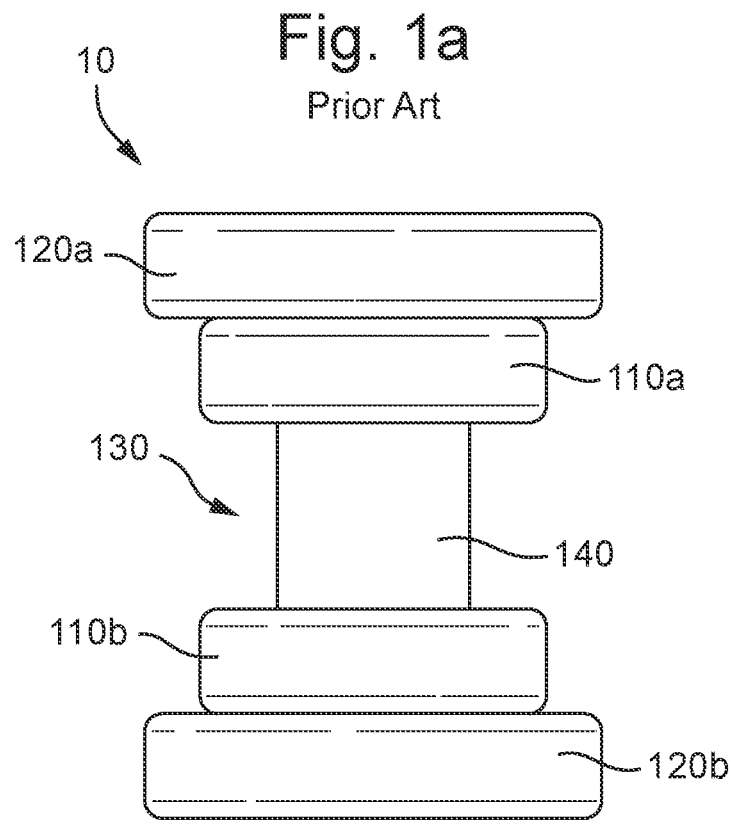
FIG. 1a shows an image of a prior art vibration suppression mount design currently used for vibration suppression in machines.
Figure 1B:
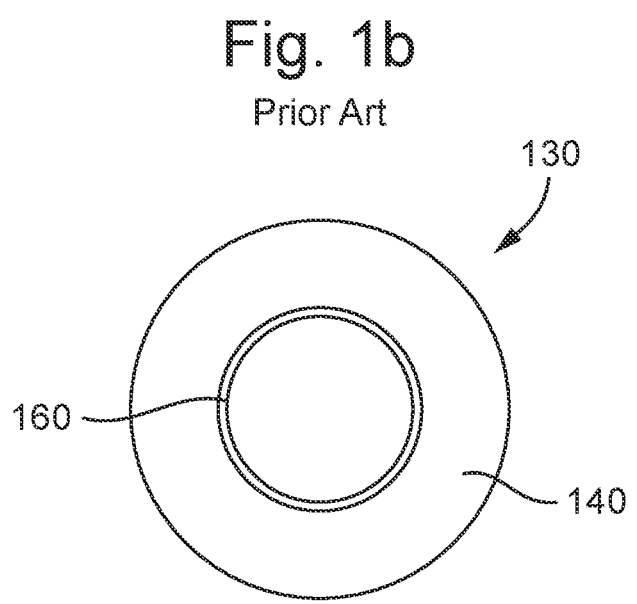
FIG. 1b shows a plan view of a prior art vibration suppression mount, specifically looking at bush configuration, with washers omitted.

Referring to prior art FIGS. 1a and 1b there is presented an existing vibration suppression mount 10, having a bush 130, comprising an elongate core 160 covered in a vibration dampening material 140. The vibration suppression mount 10 further comprises at least two end cap washers 110a and 110b mounted at the substantial ends of the bush 130 and in the embodiment shown in FIG. 1a has an additional two steel washers 120a, 120b which provide support to corresponding bush 130.

Figure 2A:
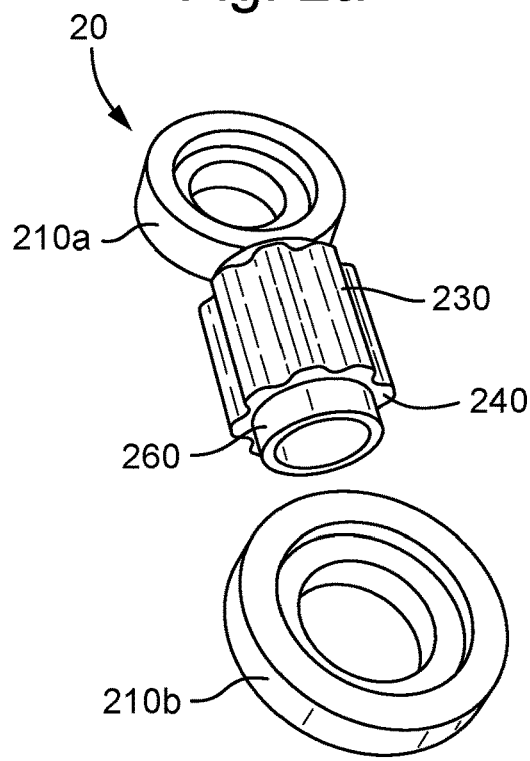
FIG. 2a shows an improved vibration suppression mount, according to the invention.
Figure 2B:
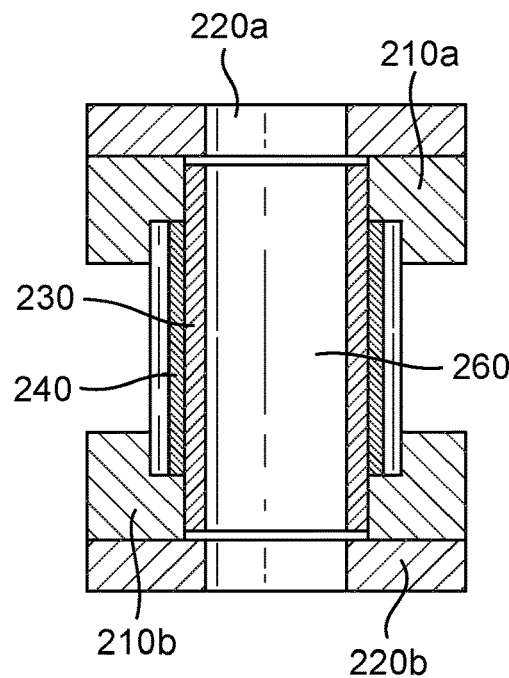
FIG. 2b shows a cross-section of a vibration suppression mount, according to the invention.
Figure 2C:
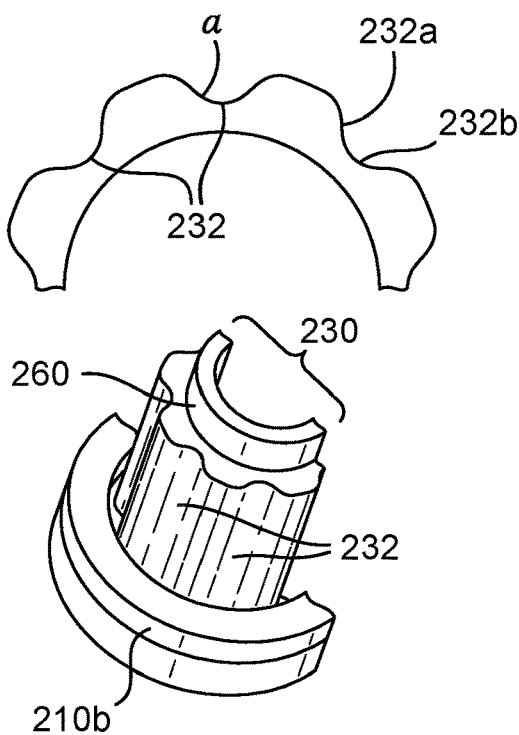
FIG. 2c shows a sectional image of the lower portion of a vibration suppression mount, according to the invention.

FIG. 2a, FIG. 2b and FIG. 2c show a preferred arrangement of the vibration suppression mount 20 comprising a bush 230 with an elongate core 260 covered with a vibration dampening material 240. The elongate core 260 is capped at each end with end cap washers 210a and 210b, FIG. 2b further shows two support housings 220a and 220b positioned on the outermost ends of the end cap washers 210a and 210b, respectively, to support the vibration suppression mount 20.

The vibration dampening material 240 covering the elongate core 260 comprises a plurality of recessed portions 232, which provide space for expansion of the vibration dampening material 240 when the bush 230 and vibration dampening material 240 are under a compressive force.

Figure 3A:
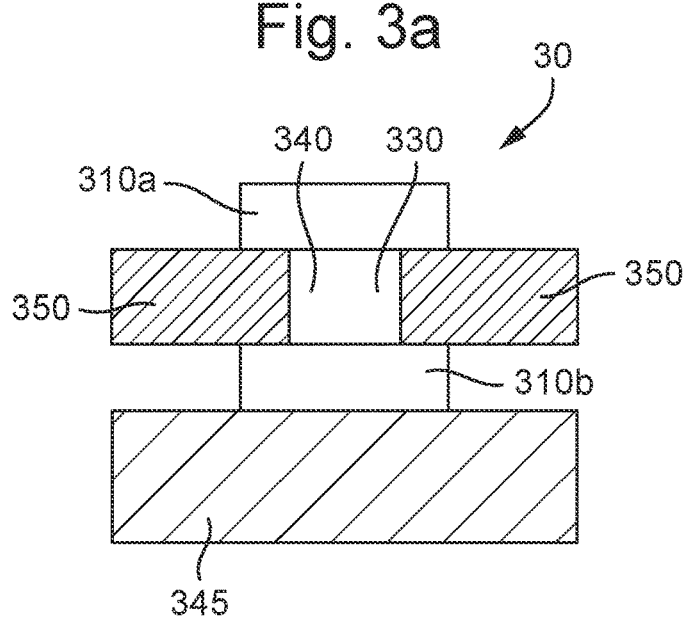
FIG. 3a shows a schematic of the vibration suppression mount mounted vertically.
Figure 3B:
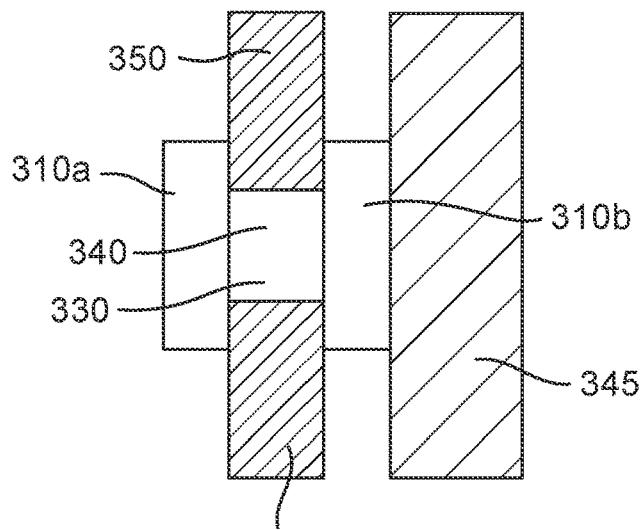
FIG. 3b shows a schematic of the vibration suppression mount mounted horizontally.
Figure 3C:
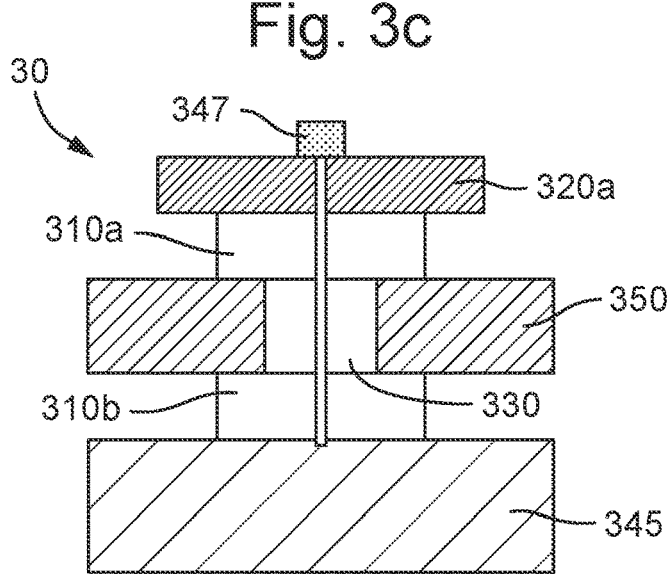
FIG. 3c shows a schematic of the vibration suppression mount with mounted vertically with support housing and secured with nut and bolt.

The recessed portion 232 comprises a recessed portion wall 232a and recessed portion floor 232b FIGS. 3a, 3b and 3c show the vibration suppression mount 30, orientated in both the vertical FIG. 3a and horizontal FIG. 3b orientations. The vibration suppression mount 30 is reversibly attached to a fixing surface 345 which may be a boat or ship hull or a vehicle chassis for example, from which surface the vibrations are to be isolated from. The machine 350 producing the vibrations to be suppressed, engages with the bush 330 while being supported by the end cap washers 310a and 310b. Vibrations caused during the machine's 350 operation may then be suppressed by the vibration dampening material 340 (on the exterior surface of the bush) and the end cap washer 310a and 310b. The recessed portions 232 (FIG. 2a-FIG. 2c) in the vibration dampening material 340 allows the vibration dampening material 340 additional expansion space, therefore optimising the rigidity of the vibration dampening material 340 to the weight of the machine 350.

FIG. 3c shows the vibration suppression mount 30 with bush 330, orientated in a vertical arrangement. The vibration suppression mount 30 is reversibly attached to a fixing surface 345, by a retainer 347, such as a nut and elongate bolt, which clamps the at least one support housing 320a to the fixing surface 345 ie the chassis or hull. In this arrangement the fixing surface is rigid, and therefore a second support housing may not be required, as the action of the nut and bolt retainer 347 can provide sufficient compression to keep the machine 350 in contact with the bush 330 and end cap washers 310a and 310b.

The invention claimed is:

1. An anti-vibration apparatus comprising a bush, said bush comprising:
    a substantially rigid elongate core;
    a vibration dampening material on an outer surface of the elongate core; and
    at least one end cap washer,
    wherein the vibration dampening material engages with the at least one end cap washer to cover an end of the elongate core, and wherein the vibration dampening material comprises a plurality of recessed portions on its surface that extend axially along a main axis of the elongate core and along an entire length of the vibration dampening material, and
    wherein the at least one end cap washer comprises a stepped portion to allow insertion of the respective end of the elongate core and to interface fit with said vibration dampening material such that the recessed portions of the vibration dampening material are within the stepped portion.

2. The apparatus of claim 1, wherein at least one of the recessed portions comprises a floor and at least one wall.

3. The apparatus of claim 2, wherein the at least one wall is a sloped or curved wall and creates an obtuse angle between the sloped or curved wall and the floor.

4. The apparatus of claim 1, wherein the vibration dampening material is an elastomer or rubber.

5. The apparatus of claim 1, wherein there are first and second end cap washers at respective first and second ends of the bush, and the apparatus further comprises two support housings each positioned to abut an outer surface of a respective one of the first and second end cap washers.

6. The apparatus of claim 5, wherein the two support housings are metal.

7. The apparatus of claim 5, further comprising: a retainer to retain the support housings and end cap washers in contact with the bush.

8. The apparatus of claim 7, wherein the retainer is an elongate bolt and nut.

9. The apparatus of claim 1, wherein the elongate core is metal.

10. An anti-vibration system, comprising a hull or chassis, a machine which produces vibration during operation, and the anti-vibration apparatus of claim 1, wherein the anti-vibration apparatus is located on the hull or chassis, and wherein the machine abuts the vibration dampening material to reduce vibrations.

11. The system of claim 10, wherein the anti-vibration apparatus further comprises a retainer which is mounted on the chassis or hull and clamps into engagement the vibration dampening material, and the at least one end cap washer with the machine which produces vibration during operation.

12. An anti-vibration apparatus comprising a bush, said bush comprising:
- a substantially rigid elongate core;
- a vibration dampening material on an outer surface of the elongate core; and
- at least two end cap washers, one located at a first end of the bush, the other located at a second end of the bush, wherein the at least two end cap washers comprise additional vibrational dampening material having a plurality of recessed portions on its surface;
- wherein the vibration dampening material engages with the at least two end cap washers to cover ends of the elongate core, and wherein the vibration dampening material comprises a plurality of recessed portions on its surface that extend axially along a main axis of the elongate core and along an entire length of the vibration dampening material.

13. The apparatus of claim 12, wherein the apparatus further comprises two support housings each positioned to abut an outer surface of a respective one of the at least two end cap washers.

14. The apparatus of claim 13, further comprising: a retainer to retain the support housings and at least two end cap washers in contact with the bush.

15. An anti-vibration apparatus comprising:
- a substantially rigid elongate core having first and second ends;
- a vibration dampening material on an outer surface of said elongate core, wherein the vibration dampening material comprises a plurality of recessed portions on its surface that extend axially along the main axis of the elongate core and along an entire length of the vibration dampening material;
- a first end cap washer configured to cover the first end of the elongate core and receive a first portion of the vibration dampening material, wherein the first end cap washer comprises a stepped portion to allow insertion of the first end of the elongate core and receipt of said first portion of the vibration dampening material; and
- a second end cap washer configured to cover the second end of the elongate core and receive a second portion of the vibration dampening material, wherein the second end cap washer comprises a stepped portion to allow insertion of the second end of the elongate core and receipt of said second portion of the vibration dampening material.

16. The apparatus of claim 15, wherein at least one of the recessed portions comprises a floor and at least one wall, and wherein the at least one wall is a sloped or curved wall and creates an obtuse angle between the sloped or curved wall and the floor.

17. The apparatus of claim 15, wherein the vibration dampening material is an elastomer or rubber, and the elongate core is metal.

18. The apparatus of claim 15, wherein the first and second end cap washers comprise additional vibrational dampening material.

19. The apparatus of claim 18, wherein the additional vibrational dampening material of the first and second end cap washers comprises a plurality of recessed portions on its surface.

20. The apparatus of claim 15, further comprising:
- a support housing configured to abut an outer surface of the first or second end cap washer; and
- a retainer to retain the support housing and end cap washers in contact with the elongate core, the retainer including an elongate bolt and nut, the bolt configured to be secured to a surface from which vibrations are to be dampened.

* * * * *